Figure 1:
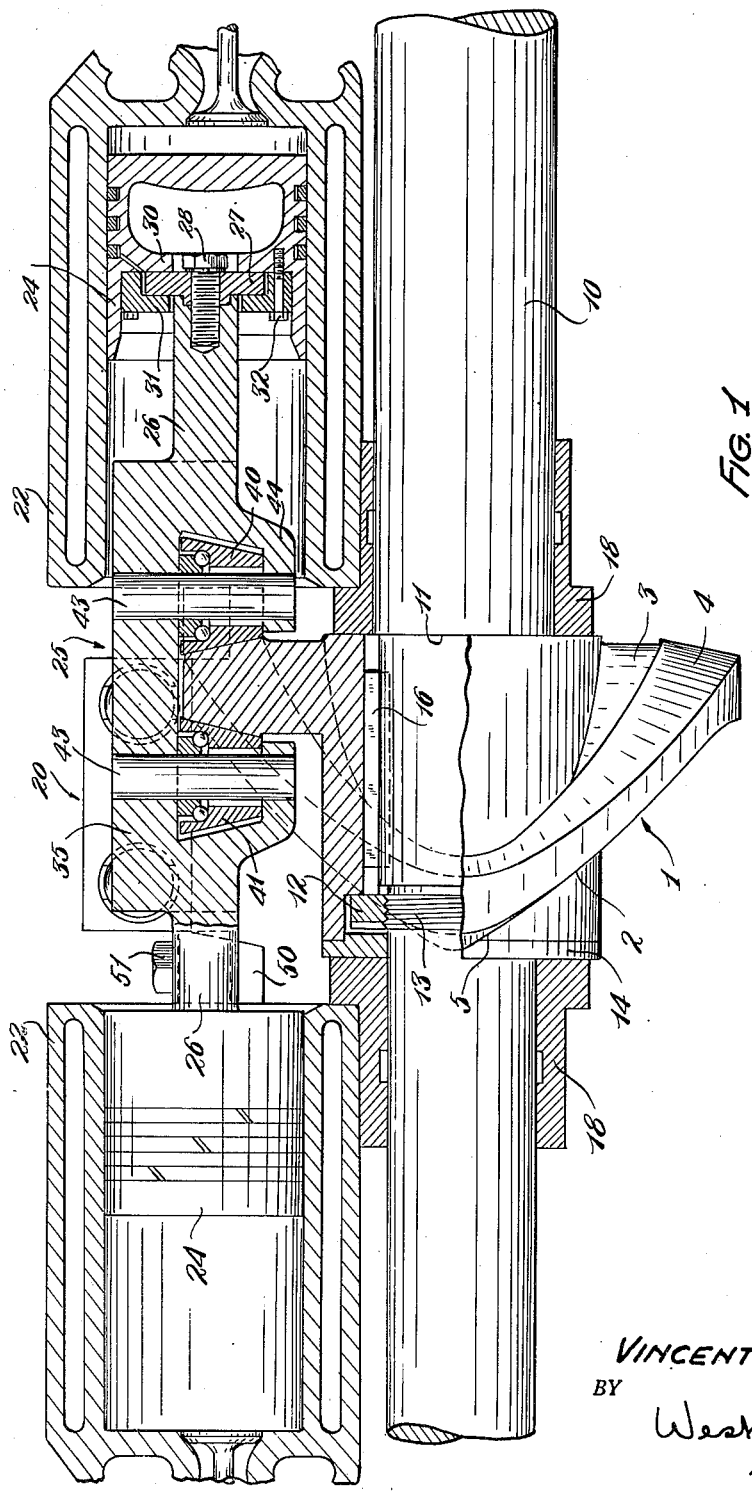

Sept. 11, 1951 V. E. PALUMBO 2,567,576
MEANS FOR GUIDING AND PREVENTING LATERAL
DISPLACEMENT OF CAM FOLLOWERS
Filed March 29, 1949 2 Sheets-Sheet 1

INVENTOR.
VINCENT E. PALUMBO
BY
West + Oldham
ATTORNEYS

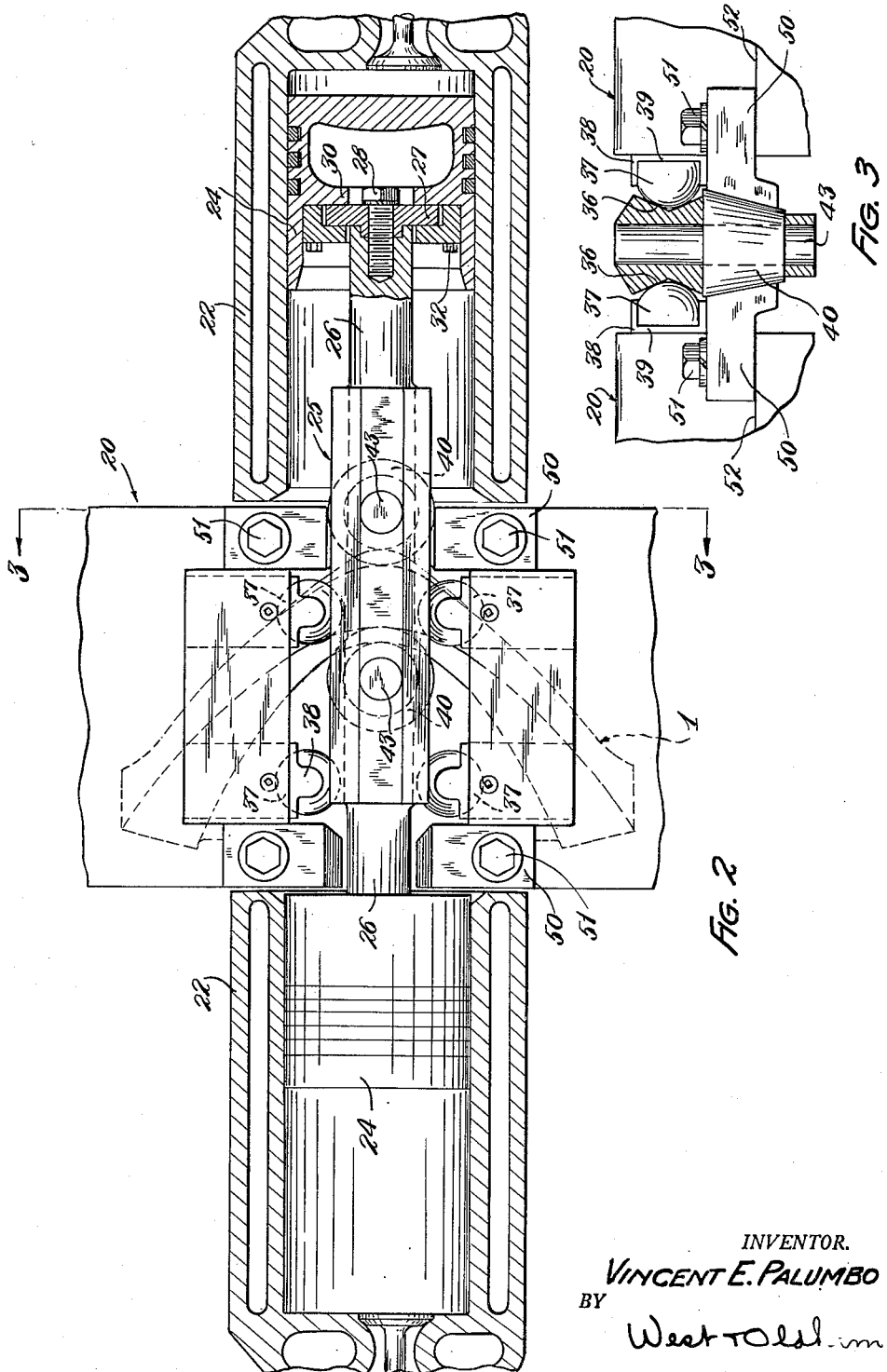

Patented Sept. 11, 1951

2,567,576

UNITED STATES PATENT OFFICE 2,567,576

MEANS FOR GUIDING AND PREVENTING LATERAL DISPLACEMENT OF CAM FOLLOWERS

Vincent E. Palumbo, Cleveland Heights, Ohio

Application March 29, 1949, Serial No. 84,201

8 Claims. (Cl. 74—56)

This invention relates to cam actions of the class wherein the cam comprises an endless helical rib that is concentric with the axis of rotation and is characterized by reversely inclined reaches that are joined by "turns" or curved portions of the rib. Followers, desirably in the form of rollers, are carried by a cross head structure or its equivalent and are spaced apart axially of the cam for engagement with opposed cam faces of the rib.

A cam action of this class has many applications, but one to which it is peculiarly suited is an engine, or like apparatus. Such apparatus, in its simplest form, includes a cylinder and a piston that operates within the cylinder and to which the cross head structure is connected. Another and quite common form of such apparatus involves opposed cylinders within which pistons operate that are connected to the opposite ends of the cross head structure. Such arrangements as those just described will be recognized by those familiar with the art as common in so-called barrel-type engines wherein the cylinders, or pairs of axially aligned opposed cylinders, are arranged about the engine shaft on which the cam is mounted with their axes parallel to the axis of the shaft.

Heretofore, in cam actions of the class referred to, whether it be one for converting reciprocatory movement into rotary motion, or vice versa, an unresisted torque is imposed upon the reciprocating structure at each end of the stroke, incident to the shifting of lateral thrust from one follower or roller to the other as the followers or rollers pass from one inclined reach of the cam to the next. In other words, at the instant of reversal, the reciprocating structure is subject to torque because, for the moment, the followers or rollers are unsupported against lateral thrust. At all other times, the followers or rollers are engaged with the opposite sides of an inclined reach of the cam rib and hold the reciprocating structure against twisting.

It is the fundamental purpose of my invention to provide a lateral thrust receiving member or abutment for engagement by the follower or roller that is on the outside of the turn or curve of the cam at each end of the stroke for sustaining said follower or roller, and consequently the cross head or equivalent structure by which it is carried, against oscillation. Inasmuch as the cam action may be reversible, I prefer to employ opposed lateral thrust receiving members or abutments between which the roller on the outside of the turn or curve of the cam recedes.

Stated otherwise, with particular reference to the opposed thrust receiving members or abutments, it is an object of the invention to provide, in cam actions of the kind referred to, a pocket adjacent each end of the stroke of the reciprocating element, within which the outer follower or roller is confined as it negotiates the turn of the cam.

Another object is to design the thrust receiving member or abutment substantially complementary to the adjacent face of the cam and dispose it in as close proximity thereto as is practical so that the follower or roller will override the surface of the stationary thrust receiving member or abutment before it entirely leaves the inclined reach of the cam.

A further object is to provide a cam action involving the invention that performs smoothly and quietly and without a "knock" as each roller rides onto and withdraws from a lateral thrust receiving member.

The foregoing objects and advantages, with others that will appear as this description proceeds, are attained in the embodiment of the invention illustrated in the accompanying drawings, and while I shall describe said embodiment in detail it will be understood that the invention is not limited thereto further than is required by the terms of the appended claims. In other words, the invention is susceptible to such changes and modifications as fall within the scope of said claims.

In the drawings, Fig. 1 is a fragmentary sectional view through an engine or the like incorporating the invention, the plane of section being radial to the axis of the engine shaft; Fig. 2 is a plan view, partly in section, of the parts shown in Fig. 1; and Fig. 3 is a transverse section substantially on the line 3—3 of Fig. 2.

Like reference characters designate like parts in the different views of the drawings.

The cam, generally denoted 1, comprises in the present instance a cylindrical body or hub 2 that is surrounded by an endless helical rib 3, having opposed cam faces 4 and 5. The rib is characterized by reversely inclined reaches that are joined through so-called "turns" or curved portions of the rib which define the ends of the stroke, so to speak. The cam is mounted on the engine shaft 10, between a shoulder 11 thereof and a nut 12 that is engaged with a thread 13 on the shaft and is concealed by a plate 14 that is suitably attached to the end of the hub 2. A key 16 holds the cam against rotation with respect to the shaft, in accordance with common practice. The engine shaft is shown as journaled in bearings 18 that are suitably mounted in appropriate parts of the engine housing, designated generally by the reference numeral 20. Assuming that the present engine is one of the well known "barrel" type, wherein pairs of opposed, axially aligned cylinders are spaced apart about the engine shaft with their axes parallel to that of the shaft, one such pair of cylinders is shown in Figs. 1 and 2 where each cylinder is designated 22. Pistons 24 are reciprocable in the cylinders, and they are joined together against relative axial movement by a cross head structure designated generally by the reference numeral 25. Said structure terminates at each end in a piston rod 26, and a disc 27 is secured to the outer end of each piston rod by a screw 28. The disc 27 is held with a working fit against a transverse wall 30 of the corresponding piston by a retainer ring 31, the ring being secured to said wall by screws 32. The ring 31 is L-shaped in cross section and the internal diameter of its peripheral flange is enough greater than the diameter of the disc 27 to permit slight lateral and orbital movement of said disc with respect to the piston, the opening within the retainer ring 31 necessarily having a diameter somewhat greater than that of the piston rod 26.

The central portion of the structure 25, or what may be referred to as the cross head proper, consists of a relatively heavy beam 35 which is shown as having concave (in the present instance V-shaped) guideways 36 along its opposite sides that receive ball bearings 37. These ball bearings operate on the principle of rollers in that their "pole" regions are journaled in lugs 38 of cages 39, the inner surfaces of said lugs being spherical to fit the contour of the balls. As the cross head structure reciprocates, the balls 37 will rotate on vertical axes that extend through the lugs 38. A bearing of this kind constitutes the subject matter of my copending application Serial No. 87,221, filed April 13, 1949. The cages 39 are non-rotatably held within bores or sockets of the engine housing 20.

Tapered rollers 40 and 41 are journaled on pins 43 whose upper ends occupy vertical bores in the beam 35, while the lower ends of said pins occupy apertures in lugs 44 that extend downwardly from the cross head and thence toward each other, the pins being suitably secured within the bores and apertures, as by having a pressed fit therein. The pins 43 are spaced apart longitudinally of the cross head a distance to dispose the rollers 40 and 41 on opposite sides of the rib 3, with said rollers engaging the cam surfaces 4 and 5, respectively.

The above described manner of supporting the cross head insures freedom of reciprocation thereof, and restriction of the cross head to a straight course of movement, notwithstanding the centrifugal force that is imposed upon the cross head when the cam action is incorporated in a barrel-type engine or the like, and notwithstanding the tendency of the cross head to be forced radially outwardly due to the reaction between the tapered rollers and the reversely tapered cam.

50 denotes lateral thrust receiving members or abutments that are secured, by screws 51, to ledges 52 of the engine housing 20 contiguous to the front ends of the cylinders 22. The adjacent faces of opposed thrust receiving members or abutments 50 are spaced apart sufficiently to receive a roller between them and each such face has a taper complemental to that of the roller. Likewise, the faces of the members or abutments that are contiguous to the cam 1 have a taper complemental to the taper of the cam surfaces of the rib 3, each of such faces being closely approached by the adjacent cam surface as the curved portions or turns of the rib pass the corresponding member or abutment.

As will be readily understood by those acquainted with engines of the kind in connection with which my improvements are disclosed, and with particular reference to the opposed cylinder type, an explosion occurs in first one and then the other of opposed cylinders thereby, through their pistons 24, to reciprocate the cross head structure 25. Through the cooperation of the rollers 40 and 41, that are carried by the cross head structure, with the cam 1, the reciprocatory movement of the cross head is translated into rotary motion and transmitted to the shaft 10. At each end of the stroke of the cross head structure, the roller 40 or 41 that is on the outer side of the turn or curve of the cam rib 3 will be disposed within the space or pocket between opposed thrust receiving members or abutments 50. The torque imposed upon the cross head structure during this phase of the operation is resisted by the lateral thrust receiving member or abutment 50 against which the involved roller 40 or 41 bears; and if the mechanism were not reversible, it would only be necessary to have such members or abutments on one side of the path of movement of the cross head structure. In view of the close proximity of the members or abutments to the course of movement of the rollers, and of the turns or curved portions of the rib of the cam, the rollers override the members or abutments well in advance of leaving the inclined reaches of the cam. Consequently, at no time is the cross head structure without adequate opposition to torque, it being understood that during the time both rollers are traversing an inclined reach of the cam, the cross head is positively held against twisting.

It is also apparent from the foregoing description that the cross head structure, including the piston rods 26 and the discs 27, is confined to a very definite and straight course of movement, and that any accidental misalignment of the opposed cylinders will be compensated for by movement of the pistons relative to said structure in planes normal to said course.

Attention is further directed to the manner in which the rollers 40 and 41 ride onto and withdraw from the roller engaging faces of the lateral thrust receiving members 50. Due to the taper of the rollers, and the inclination of the edges of said members across which the rollers move (which inclination is complemental to the taper of the cam faces of the rib 3), the said edges are oblique to the line of contact between the rollers and said faces. This insures smoothness of performance as the rollers override and withdraw from the lateral thrust receiving members, avoiding a "knock" which would be liable to occur if said edges were parallel to said lines of contact, as would be the case, for instance, if the rollers were cylindrical, and said thrust receiving members and cam were correspondingly shaped.

Having thus described my invention, what I claim is:

1. For use with a cam member embodying an endless circumferential rib characterized by reversely inclined reaches, adjacent ones of said reaches being connected through turns of the rib, a structure adapted to be supported for reciprocation along a course adjacent to such a cam member and substantially parallel to the rotating axis thereof, followers carried by said structure and spaced apart so as to adapt them for engagement with the opposite sides of said rib, and a pocket into which the follower recedes that is on the outside of the turn of the rib when said structure is at the corresponding end of its stroke, the pocket confining the follower against lateral movement.

2. For use with a cam member embodying an endless circumferential rib characterized by reversely inclined reaches, adjacent reaches being connected through turns of the rib, a structure adapted to be supported for reciprocation along a course adjacent to such a cam member and substantially parallel to the rotating axis thereof, followers carried by said structure and spaced apart so as to adapt them for engagement with the opposite sides of said rib, and a lateral thrust receiving member arranged to be engaged by the follower that is on the outside of a turn of the rib when said structure is at the corresponding end of its stroke.

3. For use with a cam member embodying an endless circumferential rib characterized by reversely inclined reaches and by turns through which adjacent reaches are connected, a structure adapted to be supported for reciprocation along a course adjacent to such a cam member and substantially parallel to the rotating axis thereof, followers carried by said structure and spaced apart so as to adapt them for engagement with the opposite sides of said rib, and two lateral thrust receiving members that are spaced apart transversely of the course of movement of said structure and between which the follower recedes that is on the outside of the turn of the rib when said structure is at the corresponding end of its stroke.

4. For use with a cam member embodying an endless circumferential rib characterized by reversely inclined reaches and by turns through which adjacent reaches are connected, a structure adapted to be supported for reciprocation along a course adjacent to such a cam member and substantially parallel to the rotating axis thereof, followers carried by said structure and spaced apart so as to adapt them for engagement with the opposite sides of said rib, and two lateral thrust receiving members that are spaced apart transversely of the course of movement of said structure and between which the follower recedes that is on the outside of the turn of the rib when said structure is at the corresponding end of its stroke, the sides of the thrust receiving members that are adapted to be positioned adjacent the cam member being shaped complementary to, and so positioned as to be closely approached by, the turns of the ribs as the cam member rotates.

5. For use with a cam member embodying an endless circumferential rib characterized by reversely inclined reaches and by turns through which adjacent reaches are connected, a structure adapted to be supported for reciprocation along a course adjacent to the cam member and substantially parallel to the rotating axis thereof, tapered rollers carried by said structure for rotation on parallel axes and are spaced apart in the direction of their course of movement and so as to adapt them for engagement with the opposite sides of said rib, and a lateral thrust receiving member arranged to be engaged by the roller that is on the outside of the turn of the rib when said structure is at the corresponding end of its stroke, the roller engaging faces of the rib of an associated cam member and of said thrust receiving members being at an angle complementary to that of the rollers.

6. For use with a cam member embodying an endless circumferential rib characterized by reversely inclined reaches and by turns through which adjacent reaches are connected, a cross head structure adapted to be supported for reciprocation along a course adjacent to such a cam member and substantially parallel to the rotating axis thereof, rollers carried by said structure that are rotatable on parallel axes and that are spaced apart in the direction of their course of movement so as to dispose the rollers for engagement with the opposite sides of said rib, each roller being frusto-conical and the apex of the projected conical surface of the roller being adapted to coincide with the rotating axis of an associated cam member, the roller engaging surfaces of the rib of said associated cam member having a taper complementary to that of the roller, and two lateral thrust receiving members that are spaced apart tranversely of the course of movement of the cross head structure and between which a roller recedes as it negotiates the outside of a turn of the rib.

7. The combination defined by claim 6, wherein the roller engaging surfaces of said thrust receiving members have a taper complementary to the taper of the rollers.

8. The combination defined by claim 6, wherein the sides of the thrust receiving members that are adapted to be disposed adjacent the cam member have a taper complementary to the taper of the roller engaging surfaces of the rib of such member and are adapted to be so positioned as to be closely approached by the outer sides of the turns of the rib as the cam member rotates.

VINCENT E. PALUMBO.

REFERENCES CITED

The following references are of record in the file of this patent:

UNITED STATES PATENTS

| Number | Name | Date |
| --- | --- | --- |
| 1,339,276 | Murphy | May 4, 1920 |
| 1,379,774 | Murphy | May 31, 1921 |
| 1,572,068 | Gould | Feb. 9, 1926 |
| 1,755,347 | Brons | Apr. 22, 1930 |
| 1,772,966 | Solver | Aug. 12, 1930 |
| 2,352,911 | Osplack | July 4, 1944 |
| 2,353,313 | Lane | July 11, 1944 |
| 2,460,527 | Oliveros | Feb. 1, 1949 |
| 2,525,712 | Neighbour | Oct. 10, 1950 |